US006070319A

United States Patent [19]

Omi et al.

[11] Patent Number: 6,070,319

[45] Date of Patent: Jun. 6, 2000

[54] APPARATUS FOR MOUNTING A CONNECTOR TO A BOARD

[75] Inventors: Takasuke Omi, Tachikawa; Takashi Kuwahara, Akishima, both of Japan

[73] Assignee: Japan Aviation Electronics Industry, Limited, Tokyo, Japan

[21] Appl. No.: 09/130,027

[22] Filed: Aug. 6, 1998

[30] Foreign Application Priority Data

Aug. 15, 1997 [JP] Japan .................................... 9-220531

[51] Int. Cl.[7] ...................................................... B23P 19/00

[52] U.S. Cl. ................................. 29/759; 29/750; 29/758

[58] Field of Search ............................. 29/759, 741, 758, 29/705, 739, 750

[56] References Cited

U.S. PATENT DOCUMENTS 4,610,082 9/1986 Anderson .............................. 29/759 X
5,116,237 5/1992 Loewen ..................................... 29/845
5,127,839 7/1992 Korunsky et al. .
5,444,906 8/1995 Korunsky et al. .................... 29/759 X
5,580,267 12/1996 Stipanuk ............................... 29/845 X

*Primary Examiner*—Carl J. Arbes
*Attorney, Agent, or Firm*—Laff, Whitsel, & Saret, Ltd.; J Warren Whitesel

[57] ABSTRACT

For mounting a connector (2) to a board (1) with the use of a clip (3), a mounting apparatus (5) includes a board holder (51) for holding the board to extend in a first direction, a clip holder (53) for holding the clip to be opposite to the board in the first direction, and a connector holder (52) for holding the connector between the board and the clip. The clip holder is movable relative to the board holder in the first direction. The connector holder is movable relative to the board holder and to the clip holder in the first direction and is turnable around a predetermined axis extending in a second direction perpendicular to the first direction. The connector holder has a holder angle controlled around the predetermined axis in accordance with relative movement between the connector holder and the clip holder in the first direction.

12 Claims, 7 Drawing Sheets

APPARATUS FOR MOUNTING A CONNECTOR TO A BOARD

BACKGROUND OF THE INVENTION

The present invention relates to a mounting apparatus and a mounting method for a connector which is mounted to a board with the use of a clip.

There have been available connectors of a board mounting type, wherein, by inserting a side edge portion of a board into clip-shaped connecting portions of elastic contacts of the connector, the connector is fixed on the board with terminal portions of the contacts being abutting under pressure conductor patterns formed on the board.

When mounting the connector of this type to the board, the contacting portion of the contact is opened by hooking with a pawl of an apparatus and, after inserting the board into the opened connecting portion, the pawl is removed or the board is directly inserted further into the connecting portion by forcibly expanding the connecting portion of the contact.

In the conventional techniques, however, it is difficult to determine a structure of the pawl, it is difficult to adjust a width of the connecting portion of the contact to be opened by the pawl, and it is difficult, due to the space limitation, to design a spring which can prevent plastic deformation of the contacting portion of the contact. Further, in particular, in case of a board having sharp corners, such as a liquid crystal glass board, if the foregoing method of forcibly expanding the connecting portion of the contact by the board is used, the contacting portion of the contact and the board are both damaged. Particularly, damages to the glass board and the conductor patterns are serious so that the poor production efficiency is resulted due to existence of defective products.

For solving the foregoing problems, there has been proposed a connector of a board mounting type by the present inventors et al. In the connector, when a board is inserted into connecting portions of contacts of the connector at a given angle, the board can be inserted without contacting the connecting portions of the contacts. Thereafter, the connector is turned toward the board with respect to a given point on the contact so that terminal portions of the contacts abut conductor patterns of the board under pressure. Then, for keeping the connection therebetween, the connector is fixed to the board using clips.

Conventionally, however, the foregoing processes have been all manually carried out. Therefore, the process of inserting the board into the connecting portions of the contacts at the given angle, the process of turning the connector toward the board and the process of attaching the clips over the connector and the board, all should be manually performed. This is quite troublesome. Particularly, it is difficult to carry out the process of inserting the board into the contacting portions of the contacts at the given angle. For example, the insertion angle of the board may go wrong to cause the board to abut the connecting portions of the contacts so that damage to the board or the contact may occur, or the connecting portions of the contacts may be subjected to plastic deformation.

SUMMARY OF THE INVENTION

It is therefore an object of the present invention to provide a mounting apparatus and method which enables to readily and smoothly mount a connector to a board with the use of clip.

It is another object of the present invention to provide a mounting apparatus and method of the type described, which can easily and accurately carry out a process of inserting the board into the connector at a first angle, a process of turning the connector to a second angle, and a process of attaching the clip over the connector and the board.

It is still another object of the present invention to provide a mounting apparatus and method of the type described, which can carry out the foregoing processes through one operation of the mounting apparatus.

Other objects of the present invention will become clear as the description proceeds.

According to an aspect of the present invention, there is provided a mounting apparatus which is for mounting a connector to a board with the use of a clip. The mounting apparatus comprises a board holder for holding the board so as to extend in a first direction and a clip holder for holding the clip to be opposite to the board in the first direction. The clip holder is movable relative to the board holder in the first direction. The mounting apparatus further comprises a connector holder for holding the connector between the board and the clip. The connector holder is movable relative to the board holder and to the clip holder in the first direction and is turnable around a predetermined axis extending in a second direction perpendicular to the first direction. The mounting apparatus further comprises movement control means connected to the connector holder and the clip holder for controlling relative movement between the connector holder and the clip holder in the first direction and angle control means coupled to the clip holder and the connector holder for controlling a holder angle of the connector holder around the predetermined axis in accordance with the relative movement.

According to another aspect of the present invention, there is provided a mounting apparatus which is for mounting a connector to a board. The mounting apparatus comprises a board holder, a connector holder and a clip holder, wherein the board holder holds the board, wherein, the connector holder holds the connector so that a mounting side surface of the connector is turned by a given angle relative to a plane parallelly contacting a mounting surface of the board with respect to a given point on a contact of the connector, the connector holder causing the connector to relatively approach the board holder along a given direction while keeping the given angle of the connector so as to insert the board into a connecting portion of the contact of the connector without abutment between the board and the connecting portion, the connector holder, after insertion of the board into the connecting portion, turning the connector relatively toward the board with respect to the given point so as to connect the contact to the board, and wherein the clip holder, after the contact is connected to the board, relatively approaches the board holder and the connector holder along the given direction so as to attach a clip to the connector and the board.

According to still another aspect of the present invention, there is provided a method of mounting a connector to a board with the use of a clip. The method comprises the steps of holding the board so as to extend in a first direction, directing the connector to a first angle offset from the first direction, approaching the connector towards the board in the first direction to insert the board into the connector at the fist angle, turning the connector from the first angle to a second angle around a predetermined axis extending in a second direction perpendicular to the first direction, the second angle making the connector be tightly connected to the board, and approaching the clip towards the board holder in the first direction to make the clip collectively clip the board and the connector at the second angle.

DESCRIPTION OF THE PREFERRED EMBODIMENT

Figure 1:
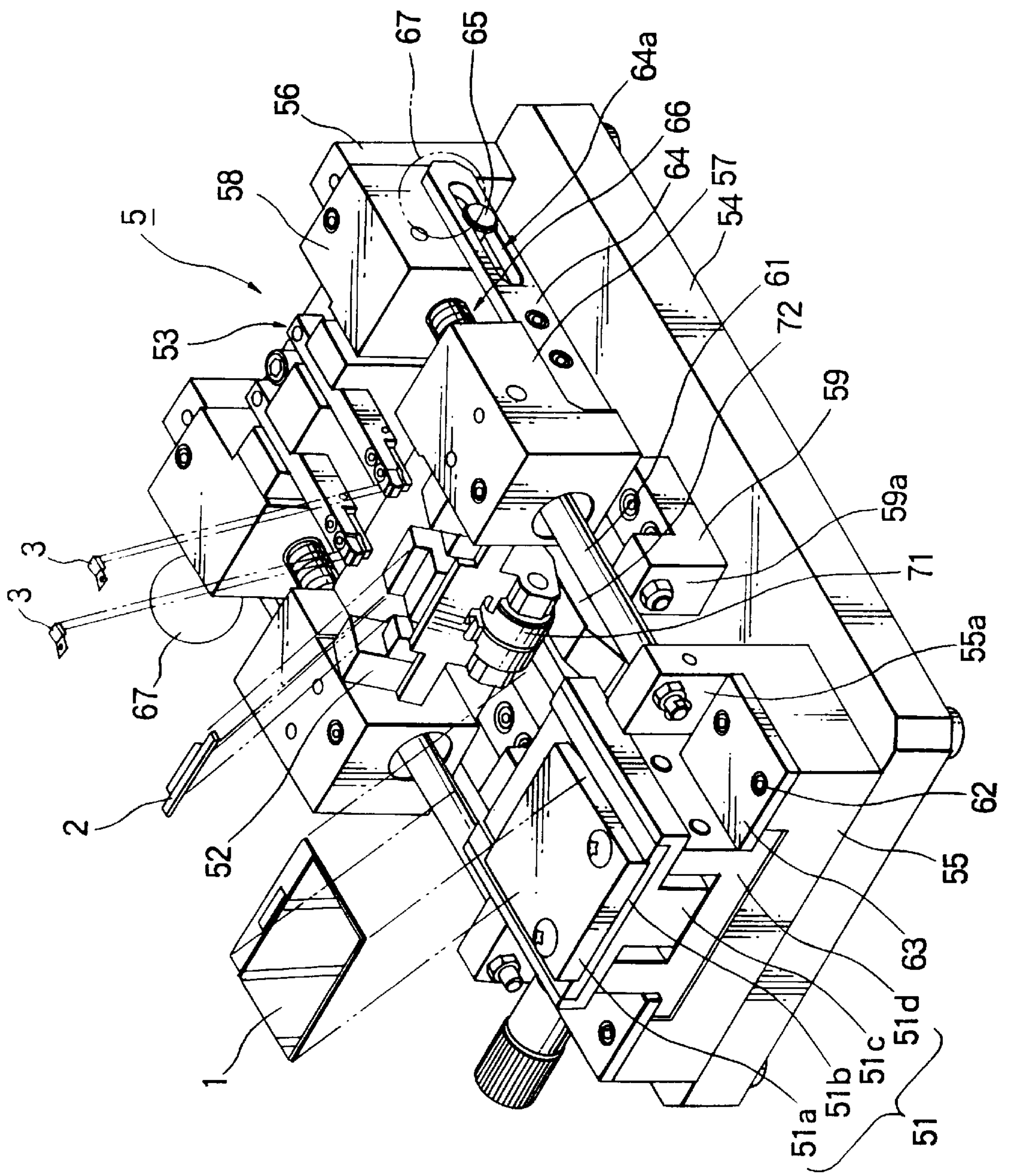
FIG. 1 is a perspective view of a mounting apparatus according to a preferred embodiment of the present invention.

Referring first to FIGS. 11 to 14, a connector 2 will be explained which will be attached to a board 1 by a mounting apparatus according to a preferred embodiment of the present invention.

The connector 2 comprises an insulator housing 21 and a plurality of conductive contacts 22. The housing 21 has a mounting side surface 21*a* to be in contact with a mounting surface 1*a* of the board 1, such as a printed circuit board or a glass board, and a fitting portion 21*b* for receiving therein a connection object (not shown), such as a board or a counterpart connector, in a fitted manner.

The contacts 22 are disposed on the mounting side surface 21*a* of the housing 21. Each contact 22 has a connecting portion 22*a*, a first terminal portion 22*b*, a second terminal portion 22*c* and a press-fit portion 22*d*. The connecting portion 22*a* of each contact 22 receives therein a side edge portion of the board 1 to hold it in a sandwiched manner so that the connector 2 is fixed to the board 1. The first terminal portion 22*b* is continuous with the connecting portion 22*a* and abuts a corresponding one of conductor patterns (not shown) formed on the board 1 so as to establish electrical connection therebetween. The second terminal portion 22*c* is disposed within the fitting portion 21*b* of the housing 21 and abuts the connection object to establish electrical connection therebetween. The press-fit portion 22*d* is press-fitted into the housing 21.

Figure 11:
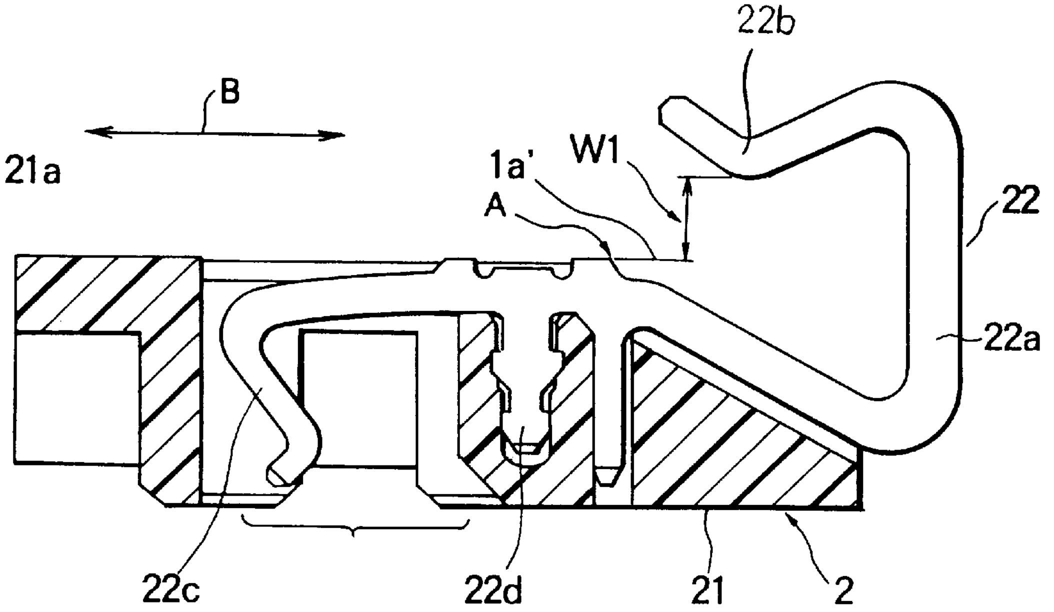
FIG. 11 is a sectional view of a connector to be mounted to a board by the use of the mounting apparatus shown in FIG. 1.
Figure 12:
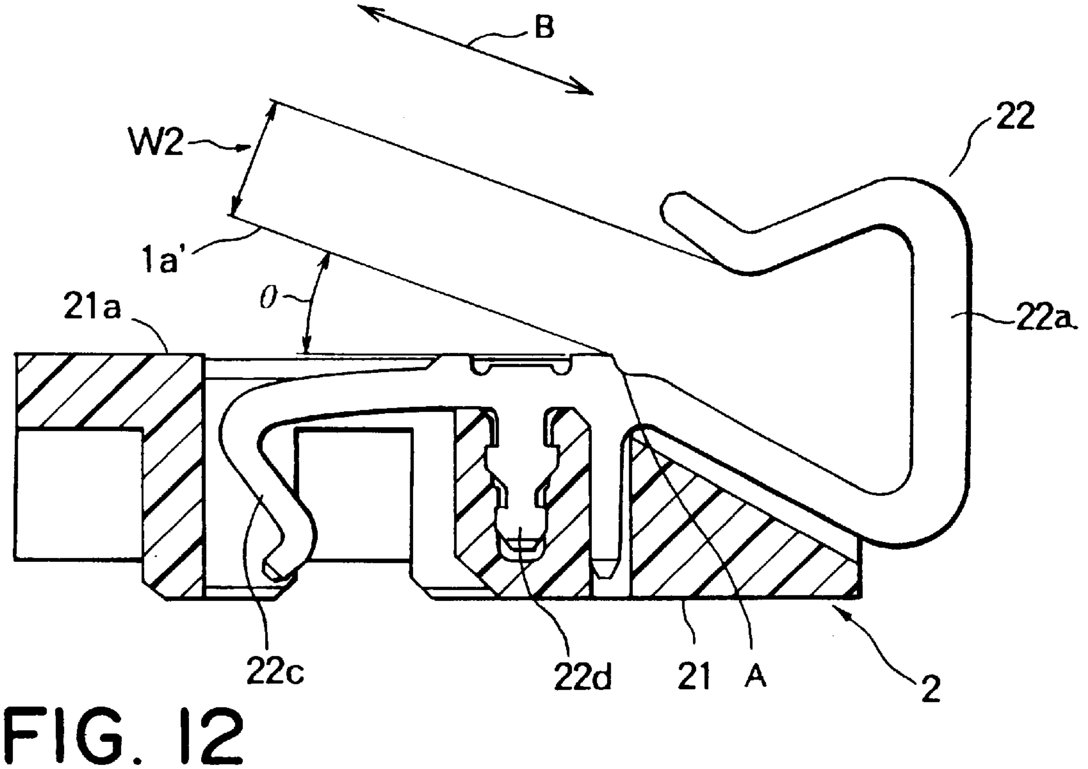
FIG. 12 is a sectional view showing a relationship between a thickness of the board and a width of an open portion of a connecting portion of the connector when the connector is turned by an angleθ.
Figure 13:
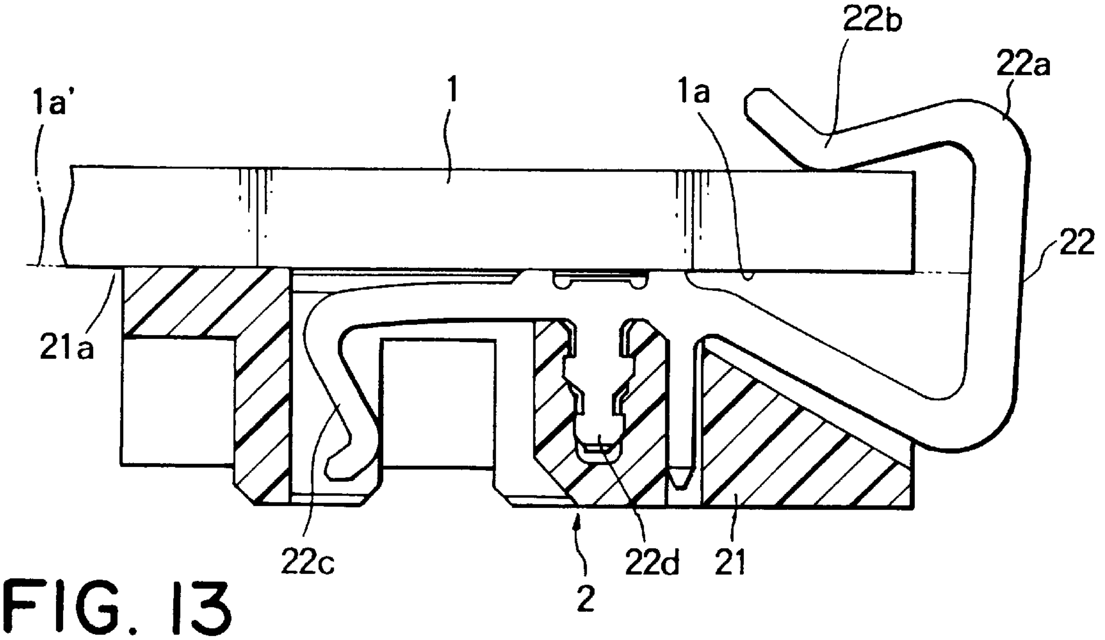
FIG. 13 is a sectional view showing a state wherein the connector shown in FIG. 11 is mounted on the board.
Figure 14:
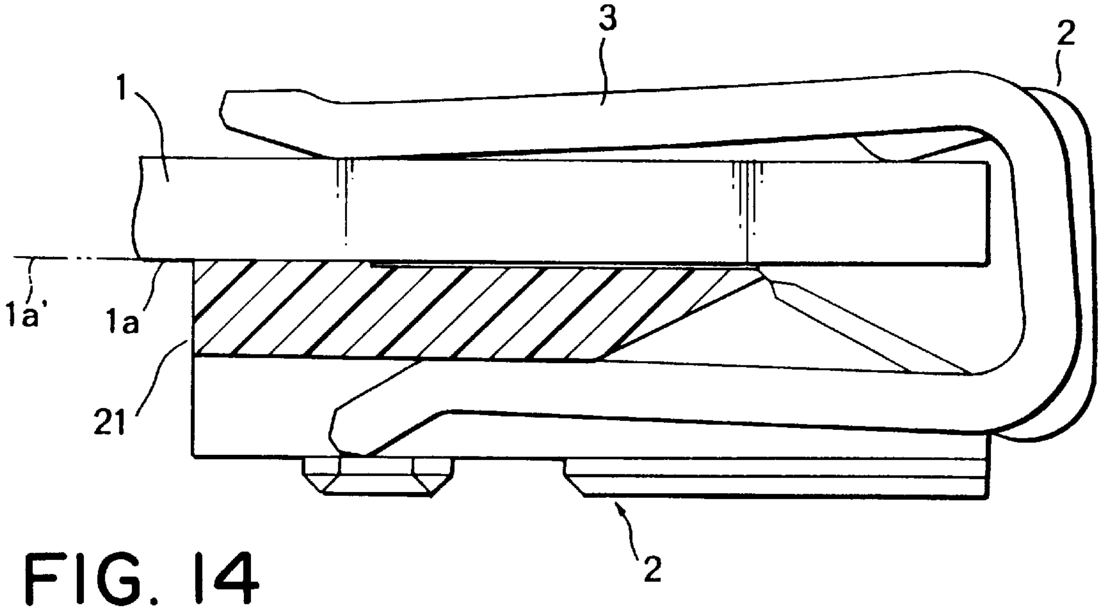
FIG. 14 is a sectional view showing a state wherein a clip is attached over the connector and the board shown in FIG. 13.

Now, an operation of the connector 2 will be explained. As shown in FIG. 11, when the mounting side surface 21*a* of the connector 2 is held in a horizontal state, a vertical width W1 of an open-side end portion of the connecting portion 22*a* is set equal to a value obtained by subtracting a deflection margin of the connecting portion 22*a* from a thickness of the board 1. On the other hand, as shown in FIG. 12, in the state wherein the connector 2 is turned by an angle θ relative to the horizontal plane with respect to a given point A on the open-side end portion of the connecting portion 22*a* (although the mounting side surface 21*a* is shown horizontal in FIG. 12, the mounting side surface 21*a* is actually inclined by θ relative to the horizontal plane), a vertical width W2 of the open-side end portion of the connecting portion 22*a* is set greater than the thickness of the board 1. Accordingly, when the board 1 is inserted relative to the connecting portions 22*a* of the contacts 22 of the connector 2 at the insertion angle θ, the board 1 can be smoothly inserted without bending the connecting portions 22*a*. After inserting the board 1 into the connecting portions 22*a* of the contacts 22, the mounting side surface 21*a* of the connector 2 is returned to the horizontal state as shown in FIG. 13 so that the first terminal portions 22*b* of the contacts 22 abut under pressure the corresponding conductor patterns formed on the board 1 to establish electrical connection therebetween. Thereafter, for holding the connection between the first terminal portions 22*b* and the conductor patterns of the board 1, clips 3 are used to fix the connector 2 to the board 1 as shown in FIG. 14.

The mounting apparatus of this embodiment is used relative to the foregoing connector 2 and board 1. Specifically, the mounting apparatus causes the board 1 to be inserted relative to the connecting portions 22*a* of the contacts 22 along a given insertion direction B without abutting the connection portions 22*a* in the state wherein the mounting side surface 21*a* of the connector 2 is turned with respect to the foregoing given point A by the given angleθ relative to a plane 1*a*' parallelly contacting the mounting surface 1*a* of the board 1. After the board 1 is inserted into the connecting portions 22*a*, the mounting apparatus causes the mounting side surface 21*a* to be turned toward the mounting surface 1*a* with respect to the given point A so as to electrically connect the first terminal portions 22*b* of the contacts 22 to the conductor patterns of the board 1. Thereafter, the mounting apparatus causes the clips 3 to be attached over the connector 2 and the board 1. The foregoing processes can be carried out through one continuous operation of the mounting apparatus.

Figure 2:
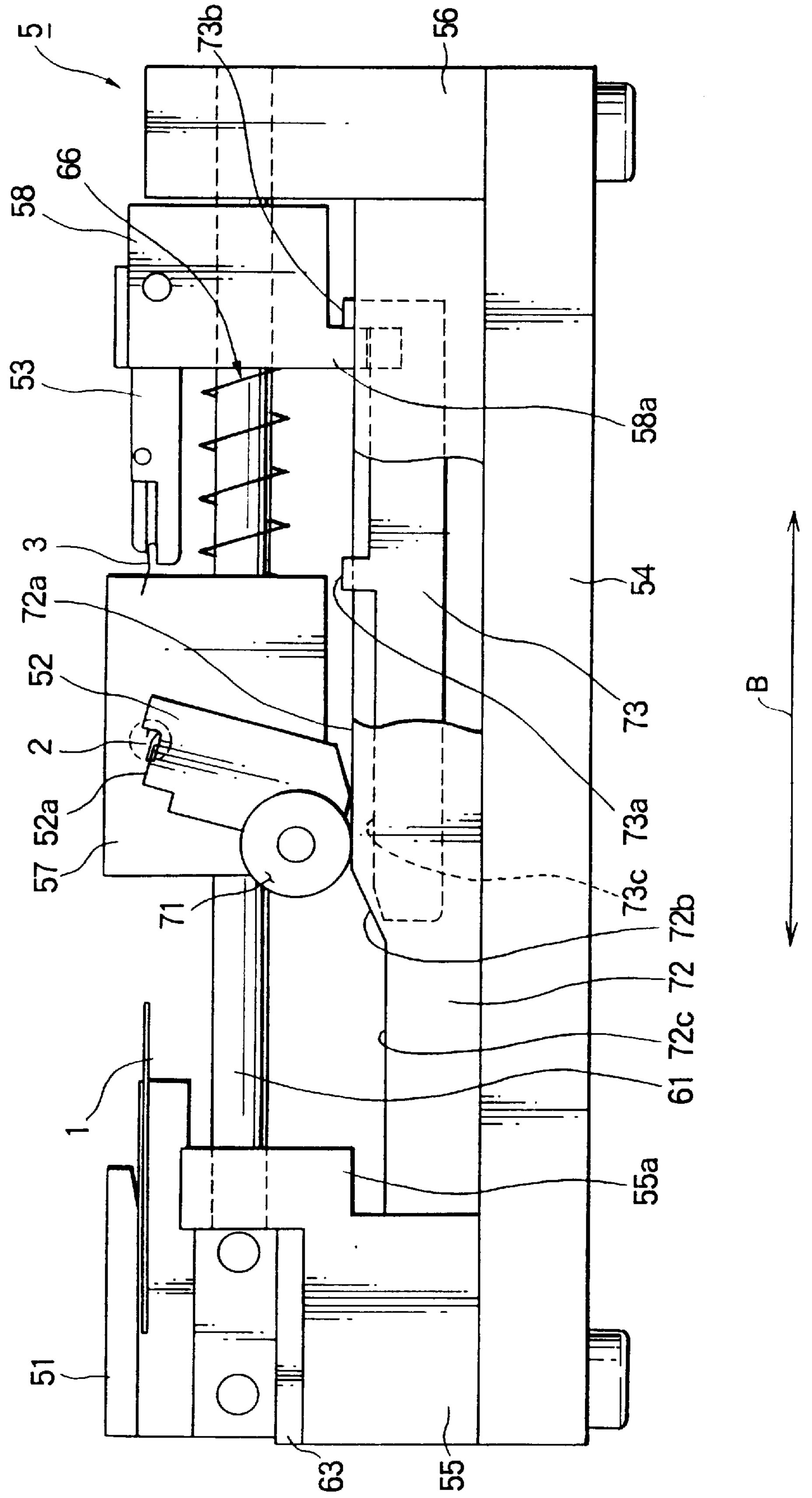
FIG. 2 is a side of the mounting apparatus shown in FIG. 1.

Referring now to FIGS. 1 and 2, description will be made as regards the mounting apparatus according to the preferred embodiment of this invention. The mounting apparatus is designated by a reference numeral 5 and comprises a board holder 51, a connector holder 52 and a clip holder 53 which are arranged in order in a first direction or a horizontal direction shown as the given direction B in FIG. 2.

The board holder 51 comprises a presser plate 51*a*, a receiving plate 51*b*, a support 51*c* and a fixed base 51*d*. The board holder 51 holds the board 1 so as to extend in the first direction. The board holder 51 is insertable and releasable in the given directions B. The mounting surface 1*a* of the board 1 is kept horizontal.

The connector holder 52 holds the connector 2 so as to allow the mounting side surface 21*a* of the connector 2 to be turned by the given angle θ relative to the plane 1a' with respect to a predetermined axis extending in a second direction perpendicular to the first direction. The predetermined axis passes through the above-mentioned given point A of the connector 2. Then, in the state wherein the connector 2 is held at the given angle θ, the connector holder 52 causes the connector 2 to approach the board holder 51 along the given direction B so that the board 1 is inserted into the connecting portions 22a of the contacts 22. Thereafter, the connector holder 52 turns the connector 2 toward the board 1 with respect to the given point A so that the first terminal portions 22b of the contacts 22 are electrically connected to the conductor patterns of the board 1.

After the contacts 22 of the connector 2 are connected to the board 1 by means of the board holder 51 and the connector holder 52, the clip holder 53 approaches the board holder 51 and the connector holder 52 along the given direction B so as to attach the clips 3 over the board 1 and the connector 2.

The mounting apparatus 5 further comprises a base 54, a front base block 55, a rear base block 56, a connector slide block 57, a clip slide block 58, clip stopper blocks 59 and a cam mechanism.

The front base block 55 has stopper portions 55a and is fixed on the base 54 at its front end, while the rear base block 56 is fixed on the base 54 at its rear end. Between the front base block 55 and the rear base block 56 are disposed a pair of shafts 61 each extending in the given directions B. Plates 63 are mounted on upper surfaces of the front base block 55 by bolts 62. By means of the plates 63, the board holder 51 is fixed on the front base block 55.

The connector slide block 57 is slidably mounted on the shafts 61 so as to be movable toward and away from the front base block 55 in the given directions B. A pair of coupling plates 64 each having an elongate hole 64a are attached to the connector slide block 57 at both sides thereof. The connector holder 52 is attached to the connector slide block 57 so as to be turnable with respect to the predetermined axis.

The clip slide block 58 is slidably mounted on the shafts 61 and has connecting pins 65 fixed thereto at both sides thereof. The connecting pins 65 are inserted through the elongate holes 64a of the coupling plates 64, respectively. Further, compression springs 66 are disposed on the shafts 61 between the clip slide block 58 and the connector slide block 57, respectively. The compression springs 66 serve as an urging arrangement. A combination of the connector slide block 57, the clip slide block 58, and the coupling plates 64 will be referred to as a coupling arrangement which is for coupling the clip holder 53 and the connector holder 52 to each other so as to permit relative movement of the clip holder 53 and the connector holder 52 within a predetermined range. A combination of the compression springs 66 and the coupling plates 64 is referred to as a movement control arrangement. With this arrangement, the clip slide block 58 is movable toward and away from the connector slide block 57 in the given directions B within a given range, that is, within the predetermined range, namely, a length of the elongate hole 64a, while urged by the compression springs 66 in the direction away from the connector slide block 57. Specifically, the clip slide block 58 is movable together with the connector slide block 57 toward and away from the front base block 55 in the given directions B until the board 1 is inserted into the connecting portions 22a of the contacts 22. Then, after the board 1 is inserted into the connecting portions 22a of the contacts 22, the clip slide block 58 is movable alone toward and away from the front base block 55 in the given directions B. A first projection 58a is formed at a lower part of the clip slide block 58, and a pair of spherical knobs 67 are attached to the clip slide block 58 at both sides thereof. The clip holder 53 is attached to the clip slide block 58 so as to be rockable in a thickness direction of the board 1 and returnable to the horizontal (neutral) position. The reason why the clip holder 53 is attached to the clip slide block 58, is to absorb vertical movements of the clips 3 upon attachment thereof.

Each of the clip stopper blocks 59 has a stopper portion 59a for stopping the clip slide block 58 and is mounted on the base 54 near the center thereof.

In this embodiment, the cam mechanism comprises a cam follower 71, a fixed cam 72 and a movable cam 73. The cam mechanism works to keep the state of the connector holder 52 turned by the given angle θ with respect to the predetermined axis upon insertion of the board 1 into the connecting portions 22a of the contacts 22, and further works to turn the connector holder 52 toward the board 1 with respect to the predetermined axis after insertion of the board 1 into the connecting portions 22a of the contacts 22. The cam mechanism is referred to as an angle control arrangement which is for controlling a holder angle of the connector holder 52 around the predetermined axis in accordance with the relative movement between the connector holder 52 and the clip holder 53.

The cam follower 71 is disposed at a lower part of the connector holder 52.

The fixed cam 72 is fixed on the base 54. The fixed cam 72 has first to third cam surfaces 72a, 72b and 72c. The first cam surface 72a engages with the cam follower 71 so as to turn, clockwise in FIG. 1, a connector loading surface 52a of the connector holder 52 by a certain angle relative to the plane (horizontal plane) 1a' with respect to the predetermined axis. The second cam surface 72b is interposed between and continuous with the first and third cam surfaces 72a and 72c. The third cam surface 72c is located below the first cam surface 72a and engages with the cam follower 71 so as to turn, counterclockwise in FIG. 1, the connector loading surface 52a of the connector holder 52 by the given angle θ relative to the plane (horizontal plane) 1a' with respect to the predetermined axis.

The movable cam 73 is disposed in a groove (not shown) formed on the fixed cam 72 so as to be movable along the given directions B. The movable cam 73 has second and third projections 73a and 73b and a fourth cam surface 73c. The second and third projections 73a and 73b are spaced apart from each other, and the first projection 58a of the clip slide block 58 is interposed therebetween. When the clip slide block 58 moves along the given directions B, the second and the third projections 73a and 73b engage with the first projection 58a. A combination of the first, the second, and the third projections 58a, 73a, and 73b will be referred to as a movement restricting arrangement which is for restricting a movable range of the movable cam 73 relative to the clip holder 53 in the first direction. The fourth cam surface 73c is located between the first and third cam surfaces 72a and 72c and engages with the cam follower 71 so as to keep horizontal the connector loading surface 52a of the connector holder 52.

Referring now to FIGS. 3–10 in addition to FIG. 2, the description will be made as regards an operation of the mounting apparatus 5.

As shown in FIG. 2, the board 1, the connector 2 and the clips 3 are set in the board holder 51, the connector holder 52 and the clip holder 53, respectively. In the initial state as shown in FIG. 2, the connector slide block 57 and the clip slide block 58 are remotest from the board 1, and the cam follower 71 rides on the first cam surface 72*a* of the fixed cam 72, that is, the connector 2 is turned, clockwise in FIG. 2, by the certain angle with respect to the predetermined axis. The movable cam 73 is also remotest from the board 1.

Figure 3:
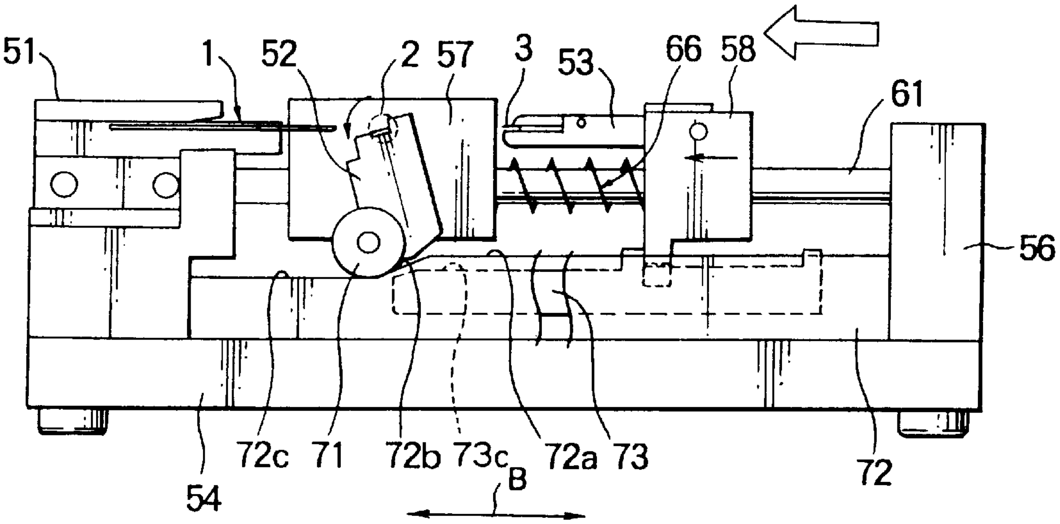
FIG. 3 is a side view showing an operation of the mounting apparatus shown in FIG. 1.

When the knob 67 (see FIG. 1) is pushed toward the board 1, as shown in FIG. 3, the connector slide block 57 and the clip slide block 58 start moving toward the board 1, and then the cam follower 71 runs down the second cam surface 72*b* of the fixed cam 72 and reaches the third cam surface 72*c*. Following this, the connector 2 is turned, counterclockwise in FIG. 3, by the angle θ with respect to the predetermined axis. In other words, the second cam surface 72*b* holds, as the holder angle of the connector holder 52, a first angle which permits the board 1 to be smoothly inserted into the connector 2.

Figure 4:
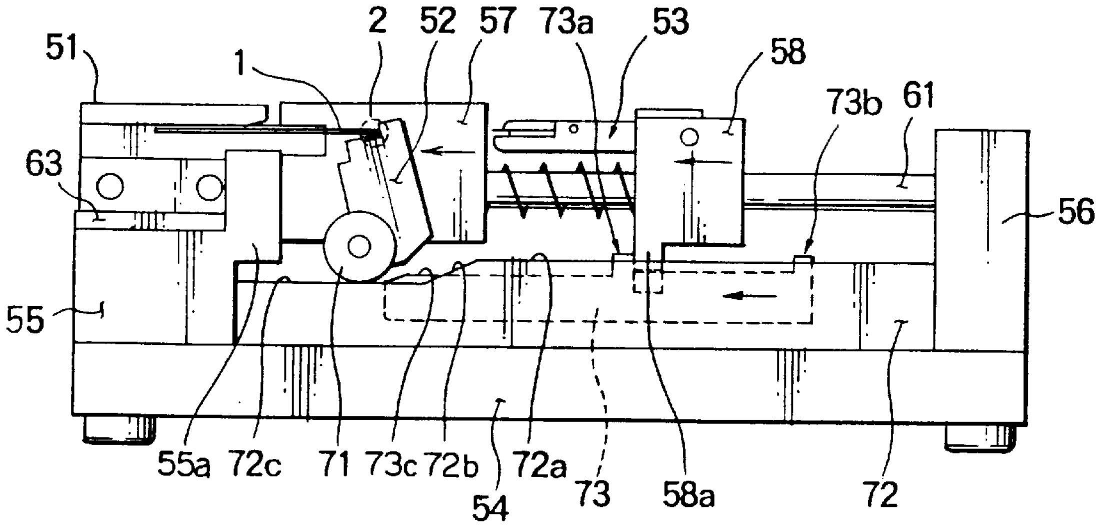
FIG. 4 is a side view showing an operation of the mounting apparatus shown in FIG. 1.

When the knob 67 is further pushed toward the board 1, as shown in FIG. 4, the connector 2 reaches the board 1 while maintaining such an angle. Then, the connector slide block 57 is stopped by engagement with the stopper portions 55*a* of the front base block 55 in the position wherein the board 1 is inserted into the connecting portions 22*a* of the contacts 22 of the connector 2.

Figure 5:
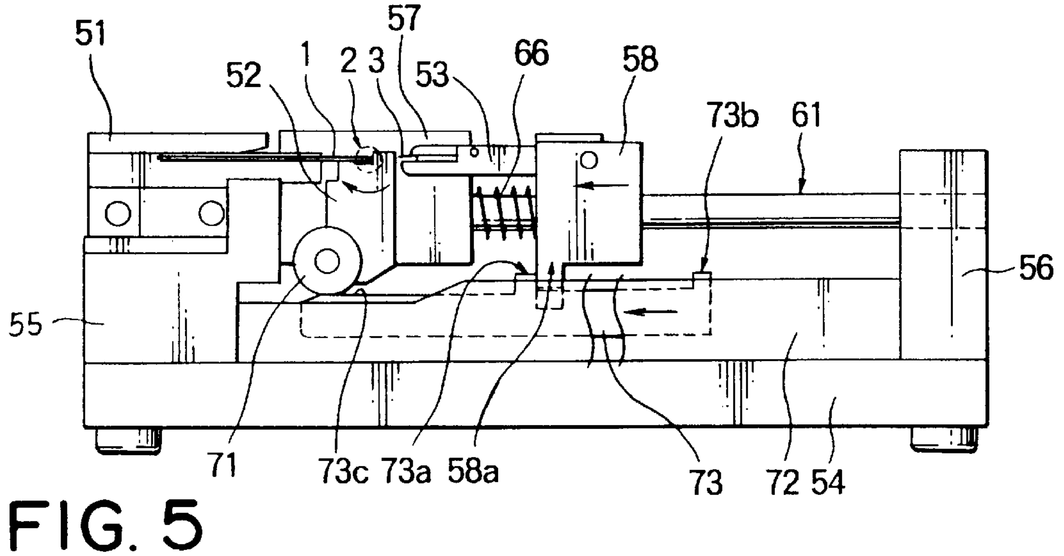
FIG. 5 is a side view showing an operation of the mounting apparatus shown in FIG. 1.

When the knob 67 is further pushed toward the board 1, as shown in FIG. 5, only the clip slide block 58 is moved so that the first projection 58*a* of the clip slide block 58 pushes the second projection 73*a* of the movable cam 73. Accordingly, the movable cam 73 is moved toward the board 1 and, following this, the cam follower 71 rides on the fourth cam surface 73*c* of the movable cam 73. As a result, the connector holder 52 is turned, clockwise in FIG. 5, by the angle θ so that the connector 2 takes a horizontal posture and is thus connected to the board 1. In other words, the fourth cam surface 73*c* holds, as the holder angle of the connector holder 52, a second angle which makes the connector 2 be tightly connected to the board 1. A combination of the second and the fourth cam surfaces 72*b* and 73*c* will be referred to as an angle selecting arrangement which is for selecting, as the holder angle of the connector holder 52, one of the first and the second angles in accordance with the relative movement between the connector holder 52 and the clip holder 53.

Figure 6:
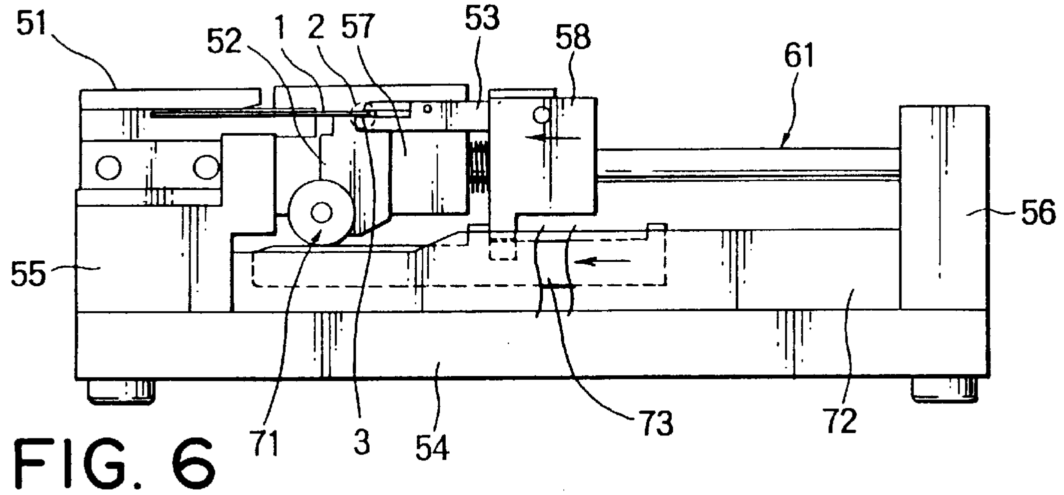
FIG. 6 is a side view showing an operation of the mounting apparatus shown in FIG. 1.

When the knob 67 is further pushed toward the board 1, as shown in FIG. 6, the clip slide block 58 together with the clip holder 53 is further advanced. Therefore, the clips 3 are mounted over the board 1 and the connector 2. In other words, the clips 3 collectively clip the board 1 and the connector 2 at the second angle.

Figure 7:
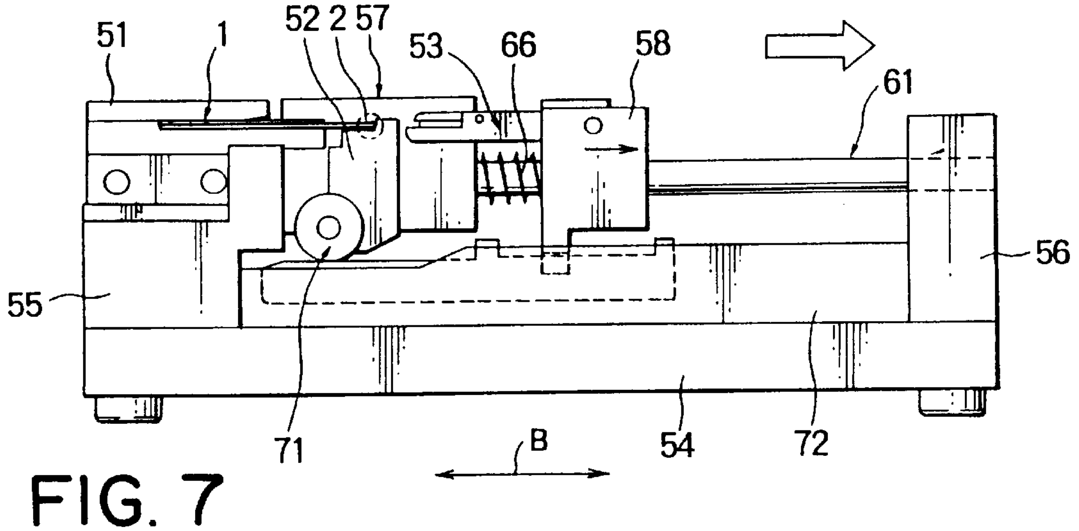
FIG. 7 is a side view showing an operation of the mounting apparatus shown in FIG. 1.

Subsequently, when the knob 67 is pulled toward the rear base block 56, as shown in FIG. 7, only the clip slide block 58 with the clip holder 53 is retreated while the board 1 and the connector 2 are stopped.

Figure 8:
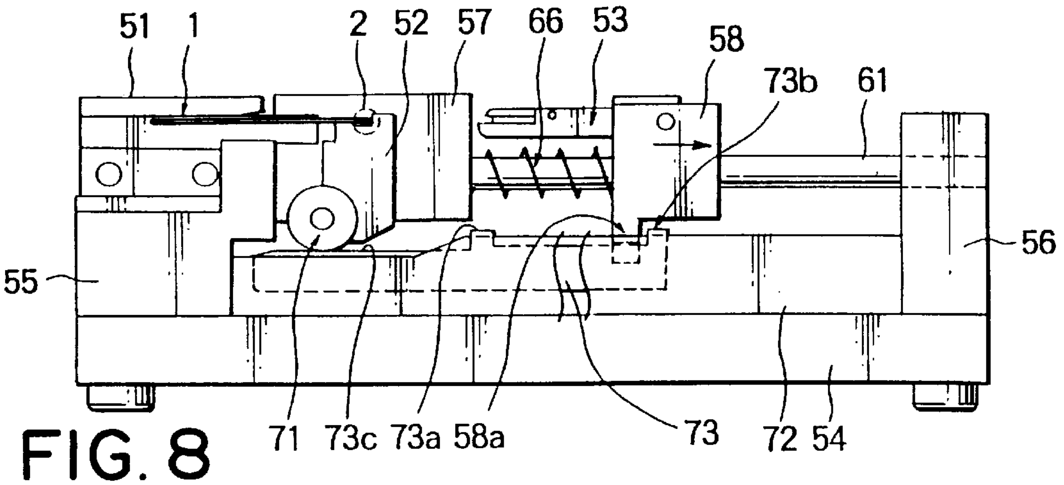
FIG. 8 is a side view showing an operation of the mounting apparatus shown in FIG. 1.
Figure 9:
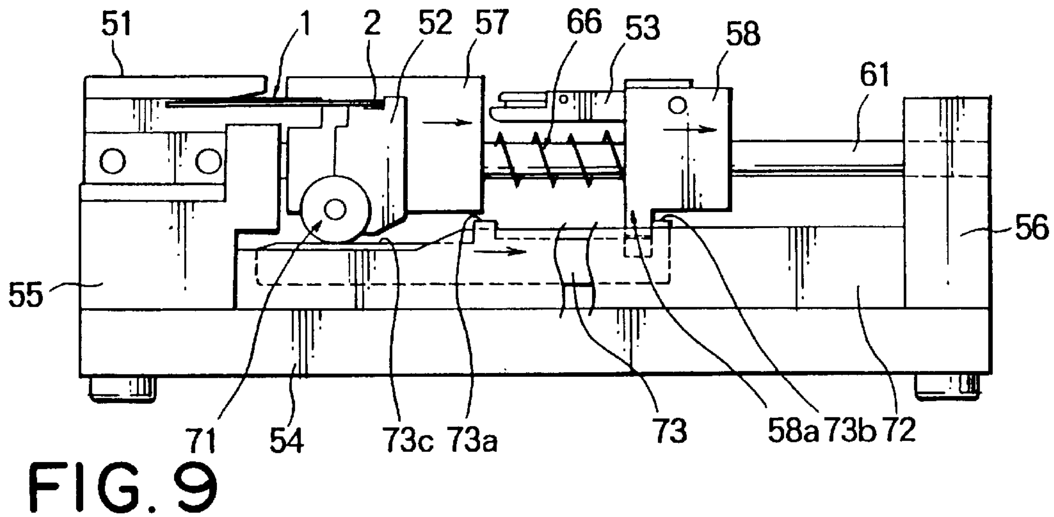
FIG. 9 is a side view showing an operation of the mounting apparatus shown in FIG. 1.

When the knob 67 is further pulled toward the rear base block 56, as shown in FIGS. 8 and 9, the connector slide block 57 is retreated pulled by the clip slide block 58 via the coupling plates 64 (see FIG. 2). At this time, the movable cam 73 is also retreated due to engagement between the first projection 58*a* of the clip slide block 58 and the third projection 73*b* of the movable cam 73. Since the cam follower 71 is on the fourth cam surface 73*c* of the movable cam 73, the connector holder 52 holds the horizontal postures of the board 1 and the connector 2.

Figure 10:
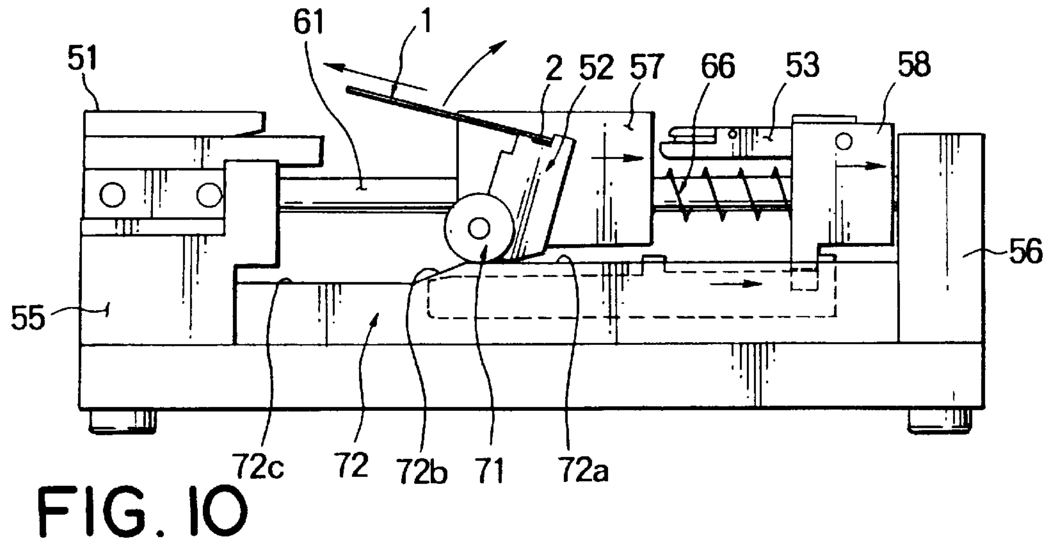
FIG. 10 is a side view showing an operation of the mounting apparatus shown in FIG. 1.

When the knob 67 is further pulled toward the rear base block 56, as shown in FIG. 10, the cam follower 71 rides on the first cam surface 72*a* of the fixed cam 72 through the second cam surface 72*b* thereof. Therefore, the board 1 and the connector 2 turn clockwise in FIG. 10 by the certain angle with respect to the given point A and jump up. Hence, the board 1 together with the connector 2 can be easily taken out. In this event, the first cam surface 72*a* serves as an angle holding arrangement which is for holding, as the holder angle of the connector holder 52, a third angle in accordance with movement of the connector holder 52. It should be noted that the third angle makes the connector 2 be readily attached to and detached from the connector holder 52.

As described above, through one reciprocation of the knob 67, it is possible to mount the connector 2 to the board 1 and then mount the clips 3 thereover, and thus complete the mounting operation.

As appreciated from the foregoing description, the process of inserting the board into the connecting portions of the contacts of the connector at the given angle, the process of turning the connector toward the board, and the process of mounting the clips over the connector and the board, can be easily and accurately carried out. As a result, damage to the board or the connector during the mounting processes can be reliably prevented. This is particularly effective for mounting the connector to the glass board to which the direct mounting of the connector was difficult.

While the present invention has been described in terms of the preferred embodiment, the invention is not to be limited thereto, but can be embodied in various ways without departing from the principle of the invention as defined in the appended claims. Although the board holder is fixed while the connector holder and the clip holder are movable, the connector holder being turnable with respect to the predetermined axis, these arrangements are all relative to each other. Accordingly, it may be arranged, for example, that the connector holder is fixed while the board holder and the clip holder are movable, and the board holder is turnable with respect to the predetermined axis, or that the clip holder is fixed while the board holder and the connector holder are movable, and one of the board holder and the connector holder is turnable with respect to the predetermined axis.

What is claimed is:

1. A mounting apparatus for mounting a connector on to a board with the use of a clip, comprising:

a base;

a board holder mounted on said base for holding said board so that said board extends in a first direction;

a clip holder mounted on said base for holding said clip in a position opposite to said board in said first direction, said clip holder being movable relative to said board holder in said first direction;

a connector holder mounted on said base for holding said connector between said board and said clip, said connector holder being pivotally moveable relative to said board holder and to said clip holder in said first direction and being turnable around a predetermined axis extending in a second direction perpendicular to said first direction;

moveable control means connected to said connector holder and said clip holder for controlling a relative movement between said connector holder and said clip holder in said first direction; and angle control means coupled to said clip holder and said connector holder for controlling a holder angle of said connector holder as it pivots around said predetermined axis in accordance with said relative movement, whereby the connector holder may be pivoted to an angle where it can receive an edge of a board and then, pivoted to another position after it receives the board in order to hold the board at a desired working position.

2. A mounting apparatus as claimed in claim 1, wherein said angle control means comprises angle selecting means which is coupled to said clip holder and said connector holder for selecting, as said holder angle, one of a first and a second angle in accordance with said relative movement, said first angle permitting said board to be smoothly inserted into said connector, said second angle making said connector be tightly connected to said board.

3. A mounting apparatus as claimed in claim 2, wherein said movement control means controls said relative movement so that said angle selecting means selects said second angle after said board is inserted into said connector at said first angle and that said clip collectively clips said board and said connector at said second angle.

4. A mounting apparatus as claimed in claim 2, wherein said angle selecting means comprises:

a fixed cam fixed to said board holder for engaging with said connector holder to set said connector holder into said first angle; and a movable cam movable relative to said board holder in said first direction and coupled to said clip holder for engaging with said connector holder to set said connector holder into said second angle when said clip holder approaches said connector holder.

5. A mounting apparatus as claimed in claim 4, wherein said angle selecting means further comprises movement restricting means connected to said clip holder and said movable cam for restricting a movable range of said movable cam relative to said clip holder in said first direction.

6. A mounting apparatus as claimed in claim 2, further comprising angle holding means which is coupled to said connector holder for holding, as said holder angle, a third angle in accordance with movement of said connector holder, said third angle making said connector be readily attached to and detached from said connector holder.

7. A mounting apparatus as claimed in claim 6, wherein said angle selecting means selects one of said first and said second angles when said connector holder is near to said board holder, said angle holding means holding said third angle when said connector holder is apart from said board holder.

8. A mounting apparatus as claimed in claim 6, wherein said angle holding means comprises a fixed cam fixed to said board holder for engaging with said connector holder to set said connector holder into said third angle when said connector holder become apart from said board holder.

9. A mounting apparatus as claimed in claim 2, wherein said mounting apparatus carries out the steps of: directing said connector holder to said first angle;

approaching said connector holder towards said board holder to insert said board into said connector at said fist angle;

turning said connector holder from said first angle to said second angle around said predetermined axis to make said connector be tightly connected to said board; and approaching said clip holder towards said board holder to make said clip collectively clip said board and said connector at said second angle.

10. A mounting apparatus as claimed in claim 1, further comprising:

coupling means for coupling said clip holder and said connector holder to each other so as to permit said relative pivotally movement within a predetermined range; and urging means coupled to said clip holder and said connector holder for urging said clip holder and said connector holder to move apart from another.

11. A mounting apparatus for mounting a connector to a board, said mounting apparatus comprising a board holder, a connector holder and a clip holder, a base wherein said board holder mounted on said base holds said board, wherein said connector holder mounted on said base holds said connector so that a mounting side surface of said connector is turned by a given angle relative to a plane parallelly contacting a mounting surface of said board with respect to a given point on a contact of said connector, said connector holder being pivotably moveable relative to the board holder and moveable control means connected to said connector holder causing said connector to relatively approach said board holder along a given direction while keeping the given angle of said connector so as to insert said board into a connecting portion of the contact of said connector without abutment between said board and said connecting portion, said connector holder, after insertion of said board into said connecting portion, turning said connector relatively toward said board with respect to said given point so as to connect said contact to said board, and wherein said clip holder which is mounted on said base, after said contact is connected to said board, relatively approaches said board holder and said connector holder along said given direction so as to attach a clip to said connector and said board.

12. A mounting apparatus as claimed in claim 11, further comprising a base block, a connector slide block, a clip slide block and a cam mechanism, wherein said base block is fixed on a base, wherein said connector slide block is movable toward and away from said base block in said given direction, wherein said clip slide block is movable toward and away from said connector slide block in said given direction within a given range, while urged in a direction away from said connector slide block, said clip slide block being movable together with said connector slide block toward and away from said base block in said given direction until said board is inserted into said connecting portion, said clip slide block, after said board is inserted into said connecting portion, being movable alone toward and away from said base block in said given direction, wherein said cam mechanism keeps a state of said connector holder turned by said given angle with respect to said given point upon the insertion of said board into said connecting portion, and turns said connector holder toward said board with respect to said given point after the insertion of said board into said connecting portion, wherein said board holder holds said board so as to be insertable and releasable in said given direction and is mounted to said base block, wherein said connector holder is mounted to said connector slide block so as to be turnable with respect to said given point, and wherein said clip holder is mounted to said clip slide block so as to be rockable in a thickness direction of said board.

* * * * *